United States Patent Office 3,288,712
Patented Nov. 29, 1966

3,288,712
PHENYLSILOXANE GREASES
Forrest O. Stark, Midland, Mich., assignor to Dow Corning Corporation, Midland, Mich., a corporation of Michigan
No Drawing. Filed May 11, 1964, Ser. No. 366,633
3 Claims. (Cl. 252—49.6)

This application relates to new, heat-resistant greases which contain phenylsiloxanes as thickeners.

The phenylsiloxanes of this invention are poly-organosiloxanes where at least 75 mole percent of their organic substituents are phenyl groups. They are hard, intractable materials, most of which are infusible.

It has been found that the phenylsiloxanes have great potential as a high-temperature grease ingredient.

The greases of this invention are known lubricating greases with an improvement comprising using as a thickener a solid, polymeric composition consisting essentially of units selected from the group consisting of

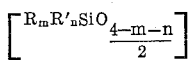

and

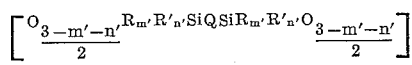

where each R is a monovalent aryl radical, each R' is selected from the group consisting of monovalent hydrocarbon and halohydrocarbon radicals of no more than 8 carbon atoms, Q is a divalent aryl radical, $m$ and $n$ each have a value of 0 to 3, $(m+n)$ being from 1 to 3; $m'+n'$ each have a value of 0 to 3, the average sum of all $m'$ and $n'$ groups per molecule being from 0 to 5; there being at least three times as many monovalent aryl substituents as there are non-aryl substituents present in the polymeric composition.

It should be noted that, for any given set of ingredients only a rather narrow range of proportions of fluid and filler will make a grease. Excess filler will cause the composition to be too crumbly for a grease, while excess fluid in the mixture will cause it to be muddy. Simple experimentation can determine the proper ratio of filler to fluid for any given system. The examples below show operable proportions for several systems.

R can be any monovalent aryl radical such as phenyl, naphthyl, anthracenyl, biphenyl, tolyl, and benzyl.

R' can be any monovalent hydrocarbon or halohydrocarbon radical such as the aryl radicals mentioned above; any alkyl radical such as methyl, ethyl, isopropyl, isohexyl, or octadecyl; any unsaturated aliphatic radical such as vinyl, allyl, or 2-hexenyl; any cycloaliphatic radical as cyclopentyl or cyclohexenyl; any haloaryl radical such as chlorophenyl, 3,5,7-tribromonaphthyl, or α,α,α-trifluorotolyl; any haloalkyl radical such as chloroethyl, 3,3,3-trifluoropropyl, or 2-perfluoroheptylethyl; any halogenated, unsaturated aliphatic radical such as fluorovinyl or 3-chloroallyl; and any cyclohaloaliphatic radical such as iodocyclohexyl or difluorocyclohexeny.

Q can be any divalent aryl radical such as phenylene, biphenylene, anthracenylene, and tolylene.

The preferred range of the thickener of this invention is from 10 to 35 weight percent, based on the weight of the final products.

The thickener of this invention can be made in several ways. Hexaphenylcyclotrisiloxane and octaphenylcyclotetrasiloxane are both well-known, and are useful as the thickener. Hexaphenylcyclotrisiloxane can be polymerized to higher polymeric siloxanes by means of such alkaline catalysts as n-butyl lithium, sodium hydroxide, sodium phenoxide, or potassium silanolate. The best temperature range of this polymerization reaction runs from about 150° to 250° C., but one must be careful not to overheat the reaction or run it for too long a time, as the higher polymeric siloxanes may degrade to the cyclic tetramer. Four to 24 hours of reaction time at 205° C. generally gives good results when potassium silanolate catalyst is used in a proportion of one potassium atom to 1000 silicon atoms.

The higher polymeric siloxanes made by the polymerization of hexaphenylcyclotrisiloxane are the preferred thickeners of this invention.

If desired, trimers that contain non-aryl substituents as defined by R', such as hexamethylcyclotrisiloxane, triphenyltrimethylcyclotrisiloxane, or

can be added to the reaction mixture for equilibration. The higher polymeric product will then contain a small amount of non-aryl substituents. Such a product is a suitable thickener, as long as the non-aryl substituents do not exceed 25 mole percent of the total substituents.

Relatively low molecular weight materials which are suitable as thickeners can be made by hydrolyzing and condensing any hydrolyzable arylsilane such as monotolyltriethoxysilane, diphenyldiethoxysilane, diphenylnaphthylethoxysilane, or mixtures of such silanes. Similar silanes with other hydrolyzable groups can also be used. Hydrolysis and condensation catalysts such as stannous octoate or triethylamine can be added, and the above-mentioned polymerization catalysts are also effective. A good temperature range for this reaction is from 100 to 150 °C.

Silanes such as dimethyldiethoxysilane or trifluoropropylmethyldichlorosilane can be added to the reaction mixture if it is desired to obtain a cocondensed product containing non-aryl groups.

Also suitable for hydrolysis and condensation to the thickeners of this invention are materials of the formula $X_pR_m'R_n'SiQSiR_m'R_n'X_p$ where X is any hydrolyzable radical such as the ethoxy, methoxy or acetoxy group, $p$ has a value of 0 through 3, there being at least one X group per molecule, and the other symbols are identified above, the sum of the $p$, $m'$, and $n'$ on each side being 3.

Upon hydrolysis, compounds of the above formula can be polymerized by means of catalysts such as guanidine octoate or NaOH, each of the above molecules forming a

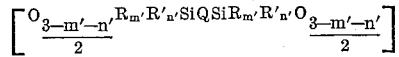

unit which is described above. The compounds can homopolymerize, or they can be copolymerized with different species of the same formula and/or the hydrolyzed silanes discussed above.

For example,

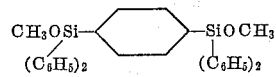

can be hydrolyzed and condensed with guanidine octoate, by heating to 150° C., to form

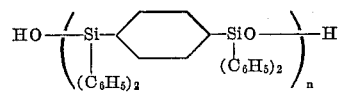

where $n$ is greater than 1.

Also,

can be hydrolyzed and cocondensed with $(C_6H_5)_2Si(OH)_2$ in the presence of dilute NaOH to form a copolymer containing

and

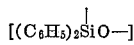

units.

The two $n'$ and $m'$ groups in the above formulae do not have to be of equal value.

For example, a compound of the formula

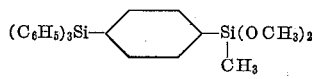

can be hydrolyzed to form a linear polymer consisting of

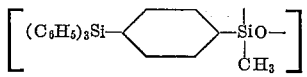

units. In this case the value of the left-hand $m'$ is 3 and the left-hand $n'$ is 0. The right-hand $m'$ is 0 and the right-hand $n'$ is 1.

The sum, however, of all $m'$ and $n'$ groups per molecule must have an average of 0 to 5. In the above example the sum of all $m'$ and $n'$ groups is 4.

Other methods of making suitable compositions for use as thickeners are shown by U.S. Patents 3,017,385 and 3,017,386.

It should be noted that many of the siloxanes which are made by the above methods can contain residual hydrolyzable and hydroxyl groups bonded to silicon atoms. Such compositions are still operative as ingredient (a), and are not construed to be outside of the claims of this application. If there is an excessive number of such hydrolyzable and hydroxyl groups, however, the grease which is formed from such material will yield water, acids, alcohols, etc. through the condensation of the groups when exposed to the temperatures for which the grease of this application has been designed. This could be harmful in certain applications of the grease. It is therefore preferred that ingredient (a) be essentially free of silicon-bonded OH and hydrolyzable groups.

The oil ingredient of the grease can be any nonreactive, stable fluid with a viscosity at 25° C. of 20 to 600,000 cs., i.e., any oil that could be used in presently known greases.

The term "nonreactive" implies that the oil must be chemically nonreactive with the grease thickener, and to water, air, and other materials commonly found in the environment where the grease is to be used.

The term "stable" implies that the fluid must not easily decompose. The fluid must be stable throughout the temperature range in which the grease is to be employed.

Any fluid of the above description is suitable in the composition of this invention. Both hydrocarbon and non-hydrocarbon oils can be used.

Examples of suitable fluids are as follows:

Naphthenic base, paraffinic base, and mixed base petroleum lubricating oils; other hydrocarbon lubricants, e.g., lubricating oils derived from coal products, and synthetic oils, e.g., alkylene polymers (such as polymers of propylene, butylene, etc., and mixtures thereof). Also, alkylene oxide-type polymers, dicarboxylic acid esters, liquid esters of acids of phosphorus, alkyl aromatic hydrocarbons, polymers of silicon, etc. Synthetic oils of the alkylene oxide-type polymers may be used, e.g., propylene oxide polymers produced by polymerizing propylene oxide in the presence of water or alcohols, e.g., ethyl alcohol; esters of ethylene oxide-type polymers, e.g., acetylated propylene oxide polymers prepared by acetylating propylene oxide polymers containing hydroxyl groups; polyethers prepared from alkylene glycols, e.g., ethylene glycol, etc.

The polymeric products prepared from the various alkylene oxides and alkylene glycols may be polyoxyalkylene diols or polyalkylene glycol derivatives; that is, the terminal hydroxy group can remain as such, or one or both of the terminal hydroxy groups can be removed during the polymerization reaction by esterification or etherification.

Synthetic oils of the dicarboxylic acid ester type include those which are prepared by esterifying such dicarboxylic acids as adipic acid, azelaic acid, suberic acid, sebacic acid, alkenyl succinic acid, fumaric acid, maleic acid, etc., with alcohols such as butyl alcohol, hexyl alcohol, 2-ethylhexyl alcohol, dodecyl alcohol, etc. Examples of dibasic (dicarboxylic) acid ester synthetic oils include dibutyl adipate, dihexyl adipate, di-2-ethylhexyl sebacate, di-n-hexylfumaric polymer.

Synthetic oils of the alkyl aromatic type include those which are prepared by alkylating benzene (e.g., dodecylbenzene, tetradecylbenzene, didodecylbenzene, etc.).

Polyhydric alcohol esters such as esters of trimethylol propane and pentaerythritol are also usable.

Synthetic oils made of silicon polymers include polysiloxane fluids of phenylmethylpolysiloxane, dimethylpolysiloxane, 3,3,3 - trifluoropropylmethylpolysiloxane, chlorophenylmethylpolysiloxane, ethylpropylpolysiloxane, copolymers of the above, and many others.

Polysiloxane fluids are the preferred fluid ingredients. Specifically, $(C_6H_5)_2CH_3SiO[(C_6H_5)(CH_3)SiO]_xSiCH_3(C_6H_5)_2$ fluid is the preferred species as the fluid ingredient for the greases of this invention, where $x$ is a positive integer that gives a material with a viscosity at 25° C. of from 300 to 10,000 cs.

The finely divided solid thickener is mixed with the oil ingredient until a greaselike composition is formed. A method of mixing that imparts shearing action is preferred. The particle size of the thickener is not critical, but the particles should be as small as possible, since it is well-known that better greases are made when the filler is very finely divided. Larger size particles will cause the grease to be grainy, and the lubricating characteristics of such a grease are likely to be poor.

Many of the greaselike compositions of this invention have unsurpassed heat stability, yet have lubricating and mechanical characteristics which are similar to ordinary greases which exhibit stability under high shear conditions.

The following examples are illustrative only and should not be construed as limiting the invention which is properly delineated in the appended claims.

*Example 1*

26.4 weight percent of a diphenylpolysiloxane polymer which had been made by the alkaline equilibration of hexaphenylcyclotrisiloxane was milled into 73.6 weight percent of a phenylmethylsiloxane fluid with diphenylmethylsiloxy endblocks and having a viscosity of about 700 cs.

The product was a grease, having an unworked penetration of 256 and a worked penetration of 279. A sample of the grease was exposed at 550° F. temperature for 1½ hours, and showed no change in color or bleeding. Only a slight amount of graininess was observed after the test.

The grease was tested in a continuous high temperature bearing test using a 204 bearing, a speed of 10,000 r.p.m., a load of 5 pounds, and a temperature of 600° F. The grease gave a bearing life of 186 hours. A good aryl-substituted urea thickened silicone grease using the same fluid as above was tested in the same bearing test, and gave a life of 160 hours.

*Example 2*

16 weight percent of a polymerizate made by heating hexaphenylcyclotrisiloxane for 12 hours at 205° C. in a nitrogen atmosphere with sufficient n-butyl lithium to give one lithium atom per 1,000 silicon atoms was milled with 84 weight percent of a phenylmethylsiloxane fluid with diphenylmethylsiloxy endblocks and having a viscosity of about 700 cs.

The product was a grease, having an initial penetration of 279, an unworked penetration of 293, and a worked penetration of 283, indicating good work stability.

The grease was heated for 24 hours at 600° F. in a cone made from metal screening in order to test the bleed of the grease. 23.02 percent by weight of the grease was lost through bleeding.

Under similar conditions it was found that the grease lost 19.19 percent of its weight through evaporation.

A bearing test similar to the test of Example 1 was performed. The bearing life at a 5 pound load was 201 hours. At a 50 pound load, the bearing life was 194 hours, indicating good lubricating life under loaded conditions on a high speed ball bearing.

Example 3

18 weight percent of a polymerizate made by heating hexaphenylcyclotrisiloxane for 24 hours at 205° C. in a nitrogen atmosphere with sufficient n-butyl lithium to give one lithium atom per 1,000 silicon atoms was milled with 82 weight percent of a phenylmethylsiloxane fluid with diphenylmethylsiloxy endblocks, and having a viscosity of about 700 cs.

A grease was formed having an initial penetration of 280.

The grease was heated for four hours at 400° F. in a cone made from metal screening in order to test the bleed of the grease. 10.5 percent by weight of the grease was lost through bleeding.

Under similar conditions it was found that the grease lost 0.30 percent of its weight through evaporation.

The grease was subjected to the bearing test of Example 1. The bearing failed after 244 hours of continuous operation.

Example 4

15.4 weight percent of a polymerizate made by heating hexaphenylcyclotrisiloxane for 6 hours at 205° C. in a nitrogen atmosphere with sufficient n-butyl lithium to give one lithium atom per 1,000 silicon atoms was milled with 84.6 weight percent of a phenylmethylsiloxane fluid with diphenylmethylsiloxy endblocks, and having a viscosity of about 700 cs.

The polymerizate used had a solution viscosity in diphenyl ether at 180° C. of 1.96, a two percent solids solution being used.

A grease was formed having an initial penetration of 272.

Example 5

11.8 weight percent of a polymerizate made by heating hexaphenylcyclotrisiloxane for four hours at 200° C. in the air with sufficient n-butyl lithium to give one lithium atom per 1,000 silicon atoms was milled with 88.2 weight percent of a phenylmethylsiloxane fluid with diphenylmethylsiloxy endblocks, and having a viscosity of about 700 cs. The polymerizate used had a solution viscosity in diphenyl ether at 180° C. of 3.22, a 2 percent solids solution being used.

A grease was formed, having an initial penetration of 275.

Example 6

A polymer was made by heating a 10 weight percent solution of hexaphenylcyclotrisiloxane in chlorobenzene at 60° C. for one-half hour with sufficient trimethylpotassium silanolate to give one potassium atom per 1,000 silicon atoms being present. The product was a precipitate, having a solution viscosity in diphenyl ether at 180° C. of 1.02, a 2 percent solid solution being used. 33.3 parts by weight of the dried precipitate from this reaction were milled with 66.7 weight percent of a phenylmethylsiloxane fluid with diphenylmethylsiloxy endblocks, and having a viscosity of about 700 cs.

A grease was formed, having an initial penetration of 290.

Example 7

17.8 weight percent of a polymerizate made by heating hexaphenylcyclotrisiloxane for 12 hours at 205° C. in a nitrogen atmosphere with sufficient n-butyl lithium to give one lithium atom per 1,000 silicon atoms was milled with 82.2 weight percent of trifluoropropylmethylsiloxane fluid with trimethylsiloxy endblocks, and having a viscosity of about 1,000 cs.

A grease was formed, having an initial penetration of 275.

Example 8

52.9 weight percent of hexaphenylcyclotrisiloxane was milled with 47.1 weight percent of a phenylmethylsiloxane fluid with diphenylmethylsiloxy endblocks, and having a viscosity of about 700 cs.

A grease was formed, having an initial penetration of 301.

Example 9

24.2 weight percent of a polymerizate made by heating hexaphenylcyclotrisiloxane for 12 hours at 205° C. in a nitrogen atmosphere with sufficient n-butyl lithium to give one lithium atom per 1,000 silicon atoms was milled with 75.8 weight percent of dimethylsiloxane fluid with trimethylsiloxy endblocks and a viscosity of 1,000 cs.

The product was a grease having an initial penetration of 290.

Example 10

To a partially condensed hydrolyzate of monophenyltrichlorosilane was added sufficient KOH to provide one potassium atom for every 450 silicon atoms. 50 g. of the hydrolyzate was diluted to 50 weight percent solids with benzene. To this was added 13 g. of a mixture of diphenyl and diphenyloxide (Dowtherm A), and the mixture was stripped of solvents up to a temperature of 110° C.

The residue was then refluxed at 250° C. for 2 hours, yielding a polymer which contained large numbers of

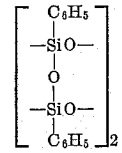

groups.

16 weight percent of this polymer was milled with 84 weight percent of a phenylmethylsiloxane fluid with diphenylmethylsiloxy endblocks and having a viscosity of about 700 cs.

The product was a grease, having an unworked penetration of 309 and a worked penetration of 309.

Example 11

When the hydrolyzate of a mixture of 50 mole percent of mononaphthyltriethoxysilane, 39.5 mol percent of diphenyldiethoxysilane, 10 mol percent of phenylmethyldiethoxysilane, and 0.5 mol percent of triphenylethoxysilane is condensed in the presence of NaOH, and when the dried, crushed condensate is milled with a copolymer fluid of a viscosity of 60,000 cs. containing 20 mole percent of phenylmethylsiloxane units, 5 mol percent of diphenylsiloxane units, and 75 mole percent of dimethylsiloxane units, a grease can be formed which exhibits good heat stability.

Example 12

When highly pulverized hexaphenyldisiloxane is milled with dimethylpolysiloxane fluid having a viscosity of 20 cs., a grease can be formed which exhibits good heat stability.

Example 13

To 80 parts by weight of 500 neutral mineral oil was added 20 parts by weight of a polymerizate made by heating hexaphenylcyclotrisiloxane for 12 hours at 205° C. in a nitrogen atmosphere with sufficient n-butyl lithium to give one lithium atom per 1,000 silicon atoms.

After milling a grease was formed, having an initial and a final penetration of 301.

Example 14

A fluid was made, containing 98 parts by weight of an ester of trimethylolpropane known as Celanese 704, 1 part of phenyl-alpha-naphthylamine, and 1 part of

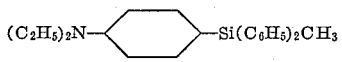

the latter two ingredients being antioxidants.

86 parts by weight of this fluid was milled with 14 parts by weight of a polymerizate made by heating hexaphenylcyclotrisiloxane for four hours at 200° C. in the air, with sufficient n-butyl lithium to give one lithium atom per 1,000 silicon atoms. The polymerizate used had a solution viscosity in diphenyl ether at 180° C. of 3.22, a 2 percent solids solution being used.

A grease was formed having an off-mill penetration of 309.

Example 15

When the following oils and thickeners are milled, greases are formed:

| Thickener | Oil |
|---|---|
| A copolymer of the formula: [structure] | Octyl adipate. |
| [structure] | Tetradecylbenzene. |
| [structure] | Equimolar quantities of polypropylene and polyethylene glycol. |
| [structure] | Tetraoctyl silicate. |

That which is claimed is:

1. A grease consisting essentially of an intimate mixture of a lubricating oil vehicle and a thickening amount of a solid, polymeric composition consisting essentially of units selected from the group consisting of $$\left[R_m R'_n SiO_{\frac{4-m-n}{2}}\right]$$

and

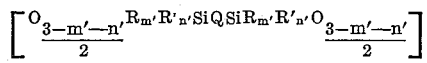

where each

R is a monovalent aryl radical, each
R' is selected from the group consisting of monovalent hydrocarbon and halohydrocarbon radicals of no more than 8 carbon atoms,
Q is a divalent aryl radical,
$m$ and $n$ each have a value of 0 to 3,
$(m+n)$ being from 1 to 3,
$m'$ and $n'$ each have a value of 0 to 3, the average sum of all $m'$ and $n'$ groups per molecule being from 0 to 5;
there being at least three times as many monovalent aryl substituents as there are non-aryl substituents present in the polymeric composition.

2. A grease, consisting essentially of an intimate mixture of
   (a) from 10 to 35 weight percent based on the weight of the final product, of a solid, polymeric composition consisting essentially of units selected from the group consisting of $$\left[R_m R'_n SiO_{\frac{4-m-n}{2}}\right]$$

and

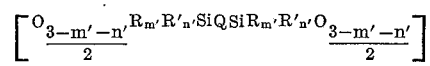

where each
R is a monovalent aryl radical, each
R' is selected from the group consisting of monovalent hydrocarbon and halohydrocarbon radicals of no more than 8 carbon atoms,
Q is a divalent aryl radical,
$m$ and $n$ each have a value of 0 to 3,
$(m+n)$ being from 1 to 3,
$m'$ and $n'$ each have a value of 0 to 3, the average sum of all $m'$ and $n'$ groups per molecule being from 0 to 5;
there being at least three times as many monovalent aryl substituents as there are non-aryl substituents present in the polymeric composition, and
   (b) from 65 to 90 weight percent of a nonreactive, stable organopolysiloxane fluid having a viscosity of from 20 to 600,000 cs. at 25° C.

3. A grease consisting essentially of an intimate mixture of
(a) from 10 to 35 weight percent of a solid polymerizate of hexaphenylcyclotrisiloxane, and
(b) from 65 to 90 weight percent of a fluid of the formula

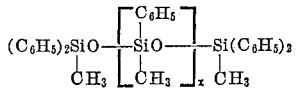

where $x$ is selected so that the viscosity of the fluid will be from 300 to 10,000 cs. measured at 25° C.

References Cited by the Examiner
UNITED STATES PATENTS
3,061,545  10/1962  Badger _____ 252—49.6

DANIEL E. WYMAN, *Primary Examiner.*

I. VAUGHN, *Assistant Examiner.*